(No Model.)
W. M. CARR.
SCREW DRIVER.
No. 486,395. Patented Nov. 15, 1892.
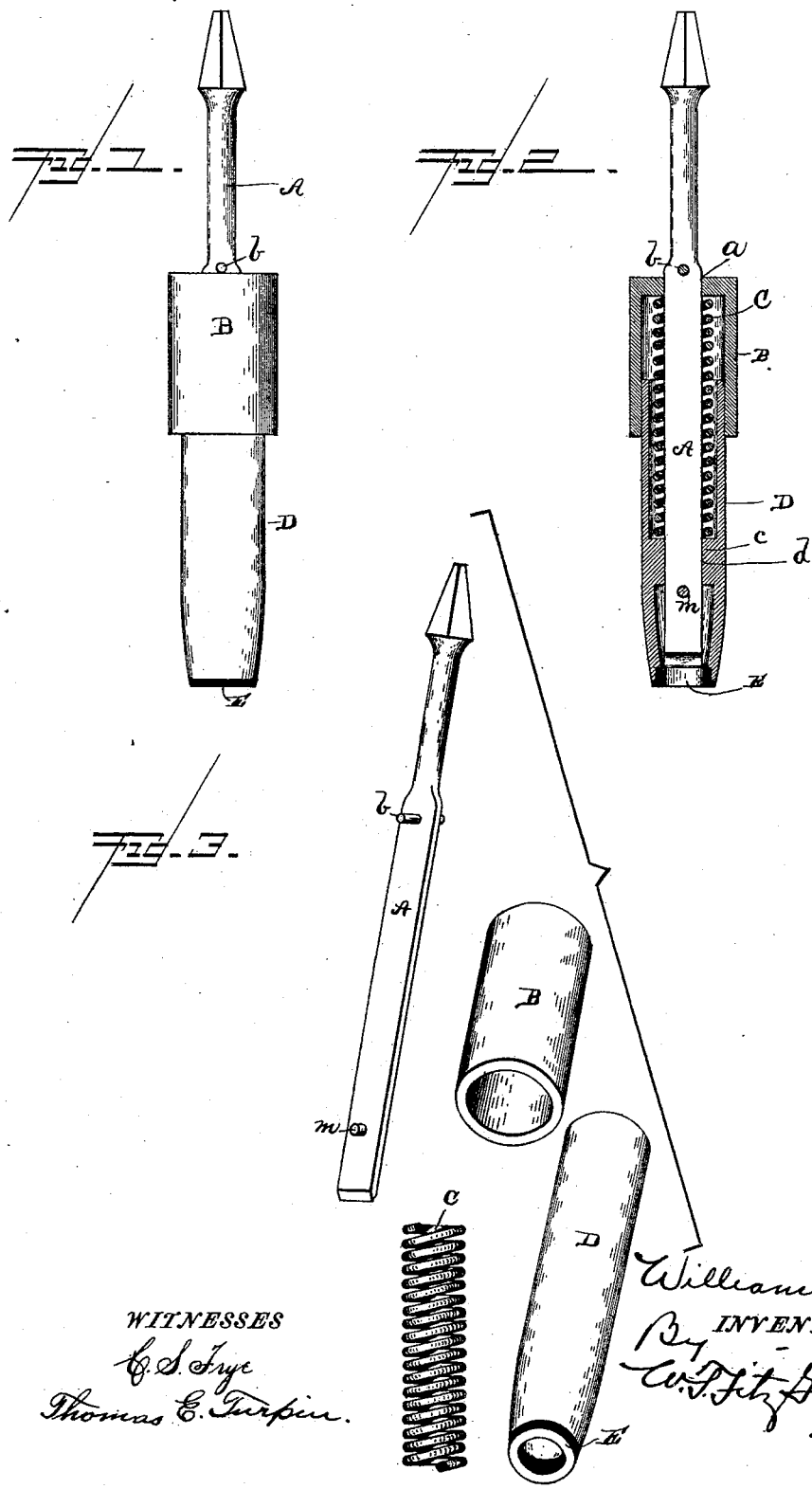
WITNESSES
C. S. Frye
Thomas E. Turpin
William M. Carr,
INVENTOR:
By W. T. Fitzgerald & Co.,
Attorneys.
THE NORRIS PETERS CO., PHOTO-LITHO., WASHINGTON, D. C.

United States Patent Office.

WILLIAM M. CARR, OF TYRONE, KENTUCKY, ASSIGNOR OF ONE-HALF TO EDMUND S. SLAUGHTER, OF SAME PLACE.

SCREW-DRIVER.

SPECIFICATION forming part of Letters Patent No. 486,395, dated November 15, 1892.

Application filed April 20, 1892. Serial No. 429,894. (No model.)

*To all whom it may concern:*

Be it known that I, WILLIAM M. CARR, a citizen of the United States, residing at Tyrone, in the county of Anderson and State of Kentucky, have invented certain new and useful Improvements in Screw-Drivers; and I do hereby declare the following to be a full, clear, and exact description of the invention, such as will enable others skilled in the art to which it appertains to make and use the same.

My invention has relation to improvements in screw-drivers, its object being to provide a screw-driver of such construction that when in engagement with a screw-head it will not be liable to casual lateral displacement.

The invention consists in the peculiar construction, certain novel combinations, and the adaptation of parts hereinafter described, and particularly pointed out in the claim appended.

In the accompanying drawings, Figure 1 is a side elevation of my improved screw-driver. Fig. 2 is a longitudinal diametrical section of the same, and Fig. 3 includes perspective views of the several elements of the driver disconnected.

In the said drawings similar letters designate corresponding parts throughout the several views, referring to which—

A indicates the shank of my improved screw-driver, which has its lower end beveled or sharpened, as shown, to engage the groove in the head of a screw and has its opposite end shaped to take into a suitable handle or into the socket of a bit-brace, as desirable.

B is a cap, which is provided in its top with a central aperture *a* for the passage of the shank A and is prevented from upward movement upon said shank by the pin *b*, which takes therethrough, or by any other suitable means. Surrounding the shank A and bearing at its upper end against the top of the cap B is a coil-spring C, which bears at its lower end against the partition *c* in the sleeve D and serves to normally hold said sleeve so that its lower end will extend beyond the lower end of the shank. Formed in the partition *c* of the sleeve D is an aperture *d* for the passage of the shank A, which the said sleeve D surrounds, as better shown in Fig. 2 of the drawings. Connected to or formed integral with the shank A, adjacent to the lower or engaging end thereof, is a lug or stop *m*, which serves in practice to limit the downward movement of the sleeve D. Mounted within the sleeve D and depending slightly below the lower end thereof is a sleeve or annulus E, of rubber or the like, which is designed and adapted to prevent the sleeve D from scratching or otherwise injuring the wood into which a screw is being pushed.

In operation it will be readily perceived that when the lower end of the sleeve D is placed over a screw and the shank A is engaged with the screw the said sleeve will hold the driver in position and will prevent the objectionable casual lateral displacement of the shank from the screw. By reason of the movable sleeve D being backed by a spring, as described, it will be readily perceived that when said sleeve reaches a board or the like into which the screw is being pushed it will take rearwardly and allow the shank to push the screw into the board or the like until the head of the screw is flush with the surface of the board.

Although I have in some respects specifically described the construction and relative arrangement of the several elements of my improved screw-driver, yet I do not desire to confine myself to the same, as such changes or modifications may be made as fairly fall within the scope of my invention.

Having thus described my invention, what I claim, and desire to secure by Letters Patent, is—

In a screw-driver, substantially as described, the combination, with the shank, the sleeve D, surrounding the same, and a spring backing the said sleeve, of the sleeve E, formed of rubber or equivalent material, mounted upon the sleeve D, substantially as and for the purpose set forth.

In testimony whereof I affix my signature in presence of two witnesses.

WILLIAM M. CARR.

Witnesses:
W. H. MCKEE,
J. S. ODEEL.